2,983,646
ANTHELMINTIC COMPOSITIONS CONTAINING SUBSTITUTED CARBANILIDES AND METHODS OF USING SAME

James S. Ruhoff, Webster Groves, Mo., assignor to Monsanto Chemical Company, St. Louis, Mo., a corporation of Delaware No Drawing. Filed Apr. 10, 1958, Ser. No. 727,555

16 Claims. (Cl. 167—53)

This invention relates to methods of and compositions for inhibiting or destroying parasites and particularly endoparasitic worm life. More specifically this invention is directed to the eradication of endoparasites as they exist in the alimentary tracts of domestic animals, which are referred to as the hosts.

The endoparasitic worms involved include among others the flat worms belonging to the phylum Plathelminthes and the round worms belonging to the phylum Nemathelminthes. Some of these endoparasitic worms suck a tuft of the host's intestinal lining into their mouth cavities and digest it slowly. Other worms of these phyla may attach themselves to the intestinal or stomach mucosa of the animal host where they may produce mechanical injury by lacerating the intestine or stomach so as to result in hemorrhaging. In other instances parasitic worms may eliminate body products that are more or less toxic to the host. These mechanical and toxic effects seriously interfere with the host's normal life and produce symptoms which impair the efficiency of the host or may even lead to the death thereof resulting in great economic losses to raisers of animals.

The control of endoparasitic worms poses a number of problems because a compound to be an effective anthelmintic must be capable of destroying worm life without having any deleterious effect upon the host organism on which the worms live. Moreover, the anthelmintic must be toxic in a digestive tract environment in which are present various enzymes and digestive fluids, which may react with the anthelmintic and more or less vitiate the toxic efficacy of the anthelmintic with respect to worm life. In other words, a suitable anthelmintic must possess a delicate balance of properties and characteristics whereby its effectiveness is not decreased by environmental fluids and must not produce any injurious or adverse effect upon the host.

According to this invention there is provided a novel anthelmintic composition which meets the foregoing exacting and critical requirements comprising a compound selected from the group consisting of halogen substituted carbanilides and thiocarbanilides.

More specifically the compositions of this invention can be used for counteracting worm infestations as they occur among the well known domestic animals including pigs, sheep, cattle, rabbits, dogs, cats, chickens, turkeys, geese, and the like. In sufficient quantities, the use of these compounds results in the eradication of the worms and when used in lesser amounts valuable prophylactic effects are produced. In other words, the compositions of this invention have valuable curative or therapeutic effects when used in larger dosages and have a preventative or prophylactic effect when smaller dosages are administered. To attain the desired curative or therapeutic effect a quantity toxic to the parasite in the order of one percent or more of the compounds of this invention based on the animal's weight can be satisfactorily used in many cases without any deleterious effect on the host animal. Where a preventive or prophylactic is sought, 1/100 of a percent or less of the compounds of this invention based on the animal's weight may be used with salutary results.

The carbanilides and thiocarbanilides which have been discovered to be useful in the present invention are represented by the formula:

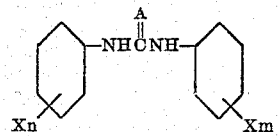

where A is selected from the group consisting of sulphur and oxygen, X is a member selected from the group consisting of bromine and chlorine, $m$ is an integer from 0 to 3, and $n$ is an integer from 0 to 3, provided the sum of $m$ plus $n$ is at least 1. Typical halogenated carbanilides and thiocarbanilides applicable for use in the present invention are 3,4,3'-trichlorocarbanilide,
3,4,4'-trichlorocarbanilide,
3,4,3',4',5'-pentachlorocarbanilide,
3,4,4'-trichlorothiocarbanilide,
3,4,3'-trichlorothiocarbanilide,
3,4,3',4'-tetrachlorothiocarbanilide,
3,4,3'-tribromocarbanilide,
3,4,4'-trichlorocarbanilide,
3,4,3'-tribromothiocarbanilide,
3,4'-dibromothiocarbanilide,
3,4,3',4',5'-pentabromothiocarbanilide,
3-chlorocarbanilide,
3,4'-dichlorocarbanilide,
4-chlorocarbanilide,
3,5'-dichlorocarbanilide,
4,5'-dichlorocarbanilide, and similar compounds. A method for preparing the carbanilides is disclosed in U.S. Patent 2,818,390. The thiocarbanilides may be prepared by reacting a halogenated aniline with polychlorophenylisothiocyanates. By way of example, p-chloroaniline in ethanol may be reacted with a stoichiometric amount of 3,4-dichlorophenylisothiocyanate to form 3,4,4'-trichlorothiocarbanilide (M.P. 154.2–154.9° C.).

The term "anthelmintic compound" as used in this patent application refers to those compounds which are effective in destroying flat and round worms such as the nematodes (round worms) of which *ascaris suilla* and *cephacia oblavata* are illustrative, and the cestodes (flat worms) of which *hymenolepis nana* is an example.

Illustrative of the anthelmintic compounds of this invention and the manner in which the compositions are used to control and destroy the growth of round and flat worms, particularly as they occur in the intestinal tracts of animals are the following examples:

Example I

Nine pigs each weighing 30 to 40 kg. heavily infested with ascarids (*ascaris suilla*) were each fed with 0.5 lb. of commercial feed containing 0.5 gm. of 3,4,4'-trichlorocarbanilide (TCC) per kg. of body weight. The pigs were observed for signs of toxicity and were examined for worms for several days following administration of the TCC compound.

It was noted that all of the pigs so fed eliminated massive amounts of ascarids. Moreover, no ova could be observed following treatment, and none of the pigs exhibited any sign of toxicity. Thus it is apparent that TCC is an effective ascaricide.

Example II

Twenty mice free of infestation were placed in a cage with ten mice bearing dual infestation of *hymenolepsis*

*nana* (a cestode) and *cephacia oblavata* (a nematode). 3,4,4'-trichlorocarbanilide (TCC) was administered to all the mice in their feed to furnish about 0.0025 gm. of TCC per 25 gm. of body weight per day or approximately 0.05% of their diet, which otherwise was a commercial feed. Ten of the mice originally free of infestation were sacrificed at 14 days and examined for infestation. The remaining 10 mice originally free of infestation were sacrificed 5 weeks later.

It was observed that none of the mice sacrificed at 14 days and only six of the mice sacrificed at 7 weeks had any sign of infestation with either parasite. Three of the mice at 7 weeks were lightly infested with the nematode and three had mixed infestation with both the nematode and cestode. The infected mice were only slightly affected by the dose, since eight out of ten were still heavily infested.

As a control twenty mice free of infestation were placed in another pen with mice infested with both of the above mentioned parasites, none of the mice receiving medication. It was observed that at the end of 7 weeks thereafter the control non-infested mice had become infested with both parasites. Since in the absence of medication both challenged infestations were readily transmitted from infested mice to non-infested mice, yet on administering as little as 0.0025 gm. of TCC per 25 gm. of body weight per day, no infestation was observed after 14 days, and only slight infestation occurred after 7 weeks, it is apparent that TCC definitely created a preventative effect with respect to infestation.

The results obtained in Examples I and II are characteristic of the results which are obtained by administering TCC or other compounds of the invention to these and other animals, such as those previously set forth in this application.

It is evident that other modes of administering the dosage may be used. For example, the compounds of this invention may be taken by the animals orally, for example in tablet or capsule form, in admixture with significant amounts, e.g. from 5% to 100% by weight based on the compound, of starch, gelatin, sugar or other excipient or diluent, or in the case of capsules, e.g. gelatin capsules, the capsule carrier may contain the compound per se. Although the anthelmintic compounds of this invention may be administered in combination with various pharmaceutical carriers, it is preferred to administer the compounds in admixture with the food taken in by the animal. Usually the concentration of the compound of the invention in the animal feed is in the range of 0.001% to 5% or more of the feed. It is to be understood that the anthelmintic compounds of the invention may be incorporated in any of the general types of food rations or diets ordinarily fed to the animals, as for example (a) dry laboratory chow diets; (b) moist, semi-solid diets; or (c) relatively dry grain forage mixtures; and the like. The food rations in which the anthelmintic compounds of this invention are incorporated may be referred to as carriers, diluents or adjuvants. Preferably the compounds of the invention are uniformly mixed with the rations. The compounds of the invention may also be administered by incorporation in the drinking water taken in by the animal to be treated.

The amount of a compound of the invention to be administered to an animal will depend to some extent on whether the treatment is to be curative or preventative in nature, the latter treatment requiring smaller amounts. Small amounts, for example as little as 0.005% of a compound of the invention based on the weight of the animal to be treated, may be administered to the animal on a daily basis with beneficial effects, particularly for prophylactic purposes. However, somewhat larger amounts are usually employed and may be required, particularly for therapeutic purposes, although it is to be understood that amounts should be avoided which would harm the animal being treated, i.e. be toxic to the animal, and it is generally not desirable to administer more than 1% based on the weight of the animal in one day and amounts of 0.05% or less are preferred for continued daily dosages. Thus, it is found that the daily dosage of a compound of the invention will usually be between the limits of 0.01% and 0.05% based on the weight of the animal. Mixtures of compounds of the invention are desirable in some instances.

It may be desirable to prepare a concentrate comprising animal feed or other diluent and the anthelmintic compound, which concentrate can be mixed with the desired amount of feed in preparing an animal's daily rations. Such concentrates can contain wide proportions of feed or other diluent, but usually contain at least 5% by weight of diluent and preferably 25% to 75% of diluent based on the sum of the diluent and compound or compounds of the invention.

The compounds of the invention are effective in combating flat and round worms generally, the species given in Examples I and II being typical of these phyla and the results in Examples I and II being characteristic of the results in combating these phyla of worms with the compounds of the invention.

While this invention has been described with respect to certain embodiments, it is to be understood that it is not so limited in that variations and modifications thereof obvious to those skilled in the art may be made without departing from the spirit or scope of the invention.

What is claimed is:

1. A method of controlling endoparasitic worms in an animal alimentary tract by introducing into said tract a toxic quantity of an anthelmintic composition comprising a compound represented by the formula

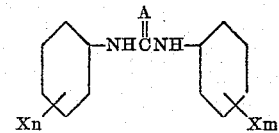

where A is selected from the group consisting of sulphur and oxygen, X is a member selected from the group consisting of bromine and chlorine, *m* is an integer from 0 to 3, and *n* is an integer from 0 to 3, provided the sum of *m* plus *n* is at least 1.

2. The method of claim 1 in which the compound is 3,4,3'-trichlorothiocarbanilide.

3. The method of claim 1 in which the compound is 3,4,3'-trichlorocarbanilide.

4. The method of claim 1 in which the compound is 3,4,3',4'-tetrachlorothiocarbanilide.

5. The method of claim 1 in which the compound is 3,4,4'-trichlorocarbanilide.

6. The method of claim 1 in which the compound is 3,4,3',4',5'-pentachlorocarbanilide.

7. A method of eradicating endoparasitic worms in an animal alimentary tract by introducing into the said tract an anthelmintic composition comprising a carrier and a toxic quantity in the range of 0.005% to 1% based on the body weight of the animal of a compound represented by the formula

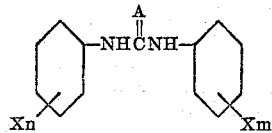

where A is selected from the group consisting of sulphur and oxygen, X is a member selected from the group consisting of bromine and chlorine, *m* is an integer from 0 to 3, and *n* is an integer from 0 to 3, provided the sum of *m* plus *n* is at least 1.

8. A method of eradicating endoparasitic worms in an animal alimentary tract by introducing into said tract a composition comprising 0.01% to 0.05% based on the body weight of the animal of a compound represented by the formula

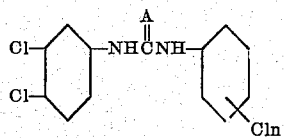

where A is selected from the group consisting of sulphur and oxygen, n is an integer from 1 to 3, and a pharmaceutical carrier, said compound being dispersed in said carrier.

9. An anthelmintic composition comprising a compound having the formula

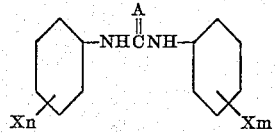

where A is selected from the group consisting of sulfur and oxygen, X is a member selected from the group consisting of bromine and chlorine, m is an integer from 0 to 3, n is an integer from 0 to 3, and the sum of $n+m$ is at least 3, and animal feed as a carrier for said compound.

10. An anthelmintic composition comprising 3,4,3'-trichlorothiocarbanilide and an animal feed as a carrier.

11. An anthelmintic composition comprising 3,4,3',4'-tetrachlorothiocarbanilide and an animal feed as a carrier.

12. An anthelmintic composition comprising 3,4,4'-trichlorocarbanilide and an animal feed as a carrier.

13. An anthelmintic composition comprising 3,4,3',4',5'-pentachlorocarbanilide and an animal feed as a carrier.

14. An anthelmintic composiiton comprising 3-chlorocarbanilide and an animal feed as a carrier.

15. An anthelmintic composition comprising an animal feed and 0.001% to 5% by weight of the feed of a compound represented by the formula

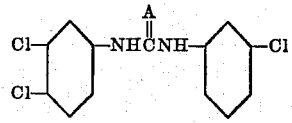

where A is selected from the group consisting of sulphur and oxygen.

16. An anthelmintic composition comprising an animal feed and a compound represented by the formula

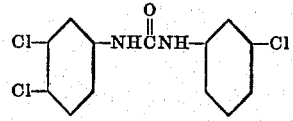

in such proportion that in each daily ration of feed there is present 0.01% to 0.05% of the compound based on the weight of the animal to be fed.

References Cited in the file of this patent

UNITED STATES PATENTS 2,846,398    Beaver _____ Aug. 5, 1958

OTHER REFERENCES

Metcalf: J. Econ. Entomology, vol. 41, 1948, pp. 875 and 878.

Cuckler: Science, vol. 122, 1955, pp. 244 and 245.